(No Model.) 2 Sheets—Sheet 1.
W. McADAMS, Jr.
DRAG SAWING MACHINE.
No. 244,278. Patented July 12, 1881.
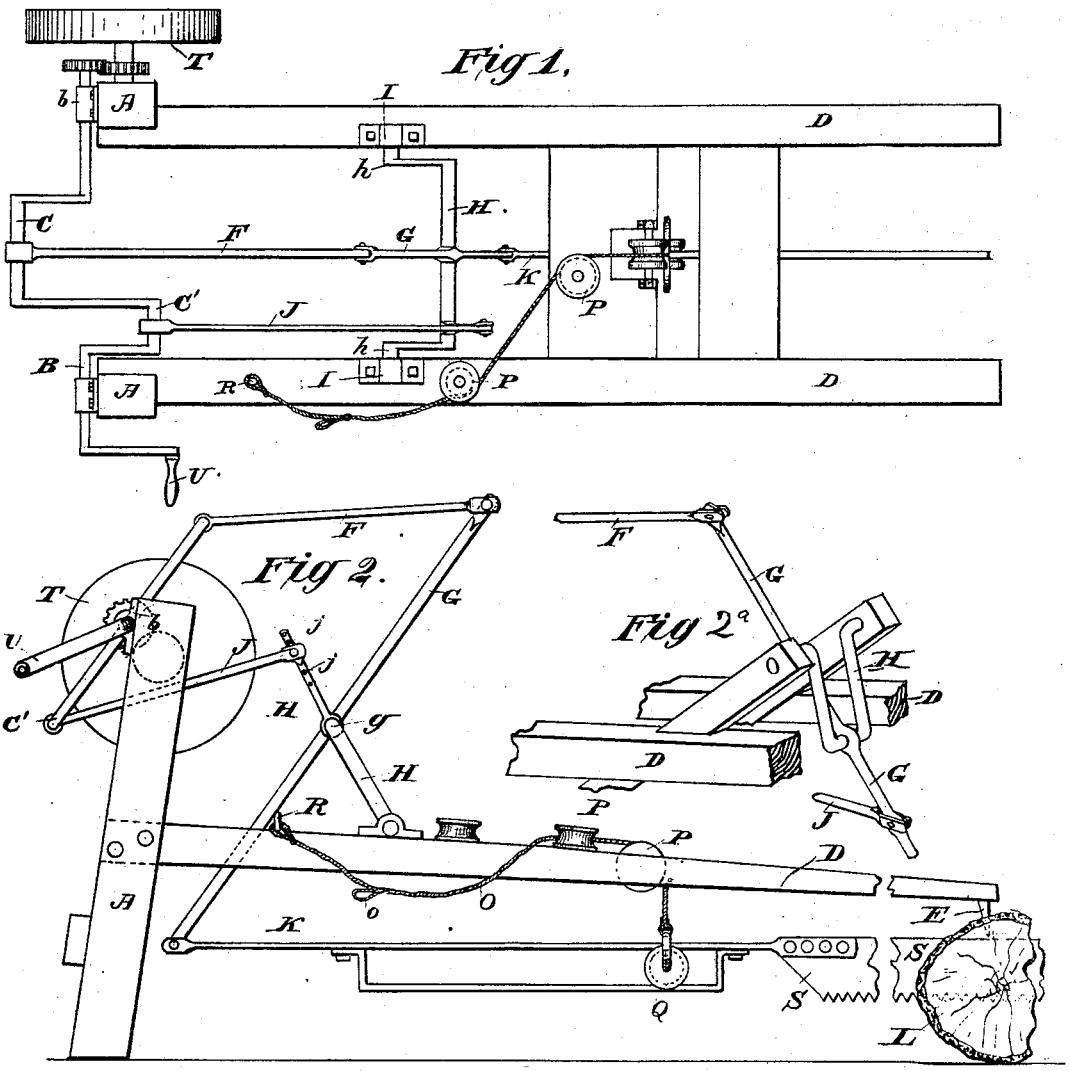

(No Model.) 2 Sheets—Sheet 2.

W. McADAMS, Jr.
DRAG SAWING MACHINE.

No. 244,278. Patented July 12, 1881.

Attest
Geo. T. Smallwood Jr.
L. M. Hopkins

Inventor:
Wilson McAdams Jr.
By Knight Bros.
attys

N. PETERS. Photo-Lithographer, Washington, D. C.

UNITED STATES PATENT OFFICE.

WILSON McADAMS, JR., OF RUSHSYLVANIA, OHIO.

DRAG-SAWING MACHINE.

SPECIFICATION forming part of Letters Patent No. 244,278, dated July 12, 1881.

Application filed May 5, 1881. (No model.)

*To all whom it may concern:*

Be it known that I, WILSON MCADAMS, Jr., a citizen of the United States, residing at Rushsylvania, in the county of Logan and State of Ohio, have invented Improvements in Sawing-Machines, of which the following is a specification.

The subject of my invention is a sawing-machine operated by a crank through the medium of a rocking lever working on a moving fulcrum, so as to impart an increased stroke to the saw by a crank of given radius.

The invention further relates to devices for raising the saw, and, if necessary, supporting it out of contact with the log while getting the machine in motion.

In order that my invention may be fully understood, I will proceed to describe it with reference to the accompanying drawings, which represent machines embodying my invention under two modifications.

Figure 3:
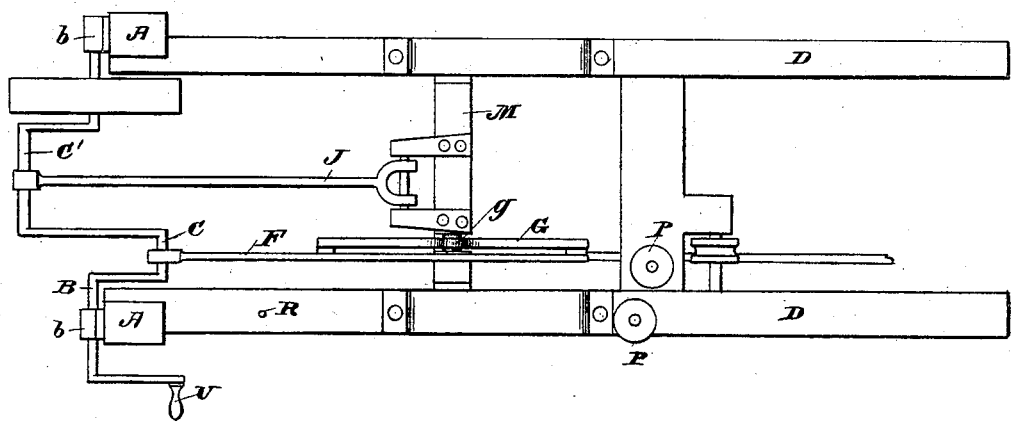
Figure 4:
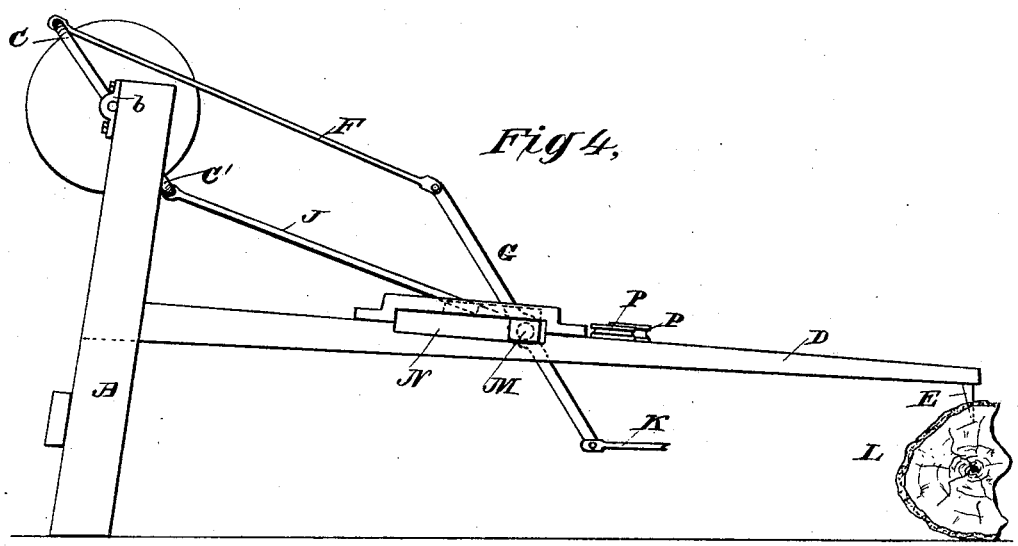

Figure 1 is a plan view of the machine with the saw thrown forward. Fig. 2 is a side elevation of the same with the saw retracted. Fig. 2ª is a view of a modification of the shifting-fulcrum. Fig. 3 is a plan of a machine illustrating a modification, the saw being here shown retracted. Fig. 4 is a side view of the machine shown in Fig. 3, but with the saw advanced.

A A are standards, forming also legs for supporting one end of the machine, and having at their upper ends bearings $b$ for a double-crank shaft, B, the cranks C C' of which are presented in opposite directions.

D D are horizontal beams terminating below in dogs E, for fastening into the log, which is shown at L.

The crank C communicates by a pitman, F, with the rocking lever G, turning at $g$ in a moving fulcrum, H, which, in the illustration shown at Figs. 1 and 2, is formed of an upwardly-projecting crank, H, turning on journals $h\ h$ in bearings I I in the horizontal beam D D. The fulcrum-crank H' is rocked to and fro by a rigid arm, H, projecting upward in the same plane, or nearly so, with the crank-arms H, and connected by a pitman, J, with the secondary crank C' of the shaft B. The fulcrum crank or frame H H' thus constitutes a lever of the second order, and the central pivoted rocking arm, G, a lever of the first order. It will thus appear that the forward movement of the crank C, throwing forward the upper end of the rocking lever G, and throwing back its rear end, as shown in Fig. 2, will retract the saw, and at the same time the rearward projection of the secondary crank C', by drawing back the fulcrum-frame H H', carrying the fulcrum $g$ of the lever G, will impart an increased motion to the lower end of the said lever, to which the saw S is connected by a frame or rod, K, thus imparting an increased stroke to the saw, and in like manner, when the crank C is thrown backward and the crank C' forward in the position shown in Fig. 1, the upper end of the lever G will be drawn back and the forward motion of the lower end of said lever will be supplemented or increased by the forward motion of the fulcrum-frame H H' imparted by the secondary crank C', thus giving an increased forward stroke to the saw. The fulcrum-frame H H' is made with a number of holes, $j$, for connection with the pitman J, so as to increase or reduce the stroke and leverage, as may be desired. The same effect is produced in the illustration shown in Figs. 3 and 4 by the use of a fulcrum-bar, M, sliding in ways N in the horizontal frame D, and connected by the pitman J with the secondary crank C', as before, while the primary crank C C is connected by the pitman F with the upper end of the rocking lever G, said lever being fulcrumed at $g$ in the sliding bar M.

For the purpose of lifting the saw I employ a cord or chain, O, passing around pulleys P, and having suspended from its extremity a grooved roller, Q, which carries the saw-frame K. The cord or chain is provided with any necessary number of loops, $o$, any one of which may be caught over the pin R, so as to retain the saw in any position to which it may be raised. The saw may thus be supported out of contact with the log L, while the grooved roller or wheel Q gives it freedom of motion. I am thus enabled to get up rapid motion of the saw before it is lowered to its work, motion being maintained and balanced in customary manner by a fly-wheel, T, which may also be used as a band-pulley when the saw is driven by power. For manual use I have shown at U a hand-crank.

My invention enables me to impart an increased stroke to the saw with great ease of operation, and with the advantageous leverage of a short crank I am thus enabled to obtain a three-foot stroke with an advantage in leverage which enables me to use a hand-crank but twelve inches long.

Having thus described my invention, what I claim as new, and desire to secure by Letters Patent, is—

1. The saw-supporting device consisting of rod or frame K, having the described slotted portion, loose pulley Q, running in said slotted portion, fixed pulleys P P, and rope or chain O, as set forth.

2. The combination of the rocking lever G, double-crank shaft B C C', and pitmen F J, with the moving fulcrum and a saw-frame and saw, substantially as herein described.

WILSON McADAMS, Jr.

Witnesses:
JOHN KAUTZMAN,
J. A. CASAHOOF.